(12) United States Patent
Schantz

(10) Patent No.: US 7,391,383 B2
(45) Date of Patent: Jun. 24, 2008

(54) CHIRAL POLARIZATION ULTRAWIDEBAND SLOT ANTENNA

(75) Inventor: Hans Gregory Schantz, Huntsville, AL (US)

(73) Assignee: Next-RF, Inc., Huntsville, AL (US)

( * ) Notice: Subject to any disclaimer, the term of this patent is extended or adjusted under 35 U.S.C. 154(b) by 128 days.

(21) Appl. No.: 11/235,259

(22) Filed: Sep. 26, 2005

(65) Prior Publication Data

US 2006/0028388 A1 Feb. 9, 2006

Related U.S. Application Data

(63) Continuation-in-part of application No. 10/714,046, filed on Nov. 14, 2003, now Pat. No. 6,950,064.

(60) Provisional application No. 60/438,724, filed on Jan. 8, 2003, provisional application No. 60/433,637, filed on Dec. 16, 2002.

(51) Int. Cl.
*H01Q 1/10* (2006.01)
(52) U.S. Cl. .......................... 343/767; 343/770
(58) Field of Classification Search ................ 343/767, 343/770, 895
See application file for complete search history.

(56) References Cited

U.S. PATENT DOCUMENTS 5,568,159 A * 10/1996 Pelton et al. ............... 343/767
5,748,153 A * 5/1998 McKinzie et al. .......... 343/767
5,764,696 A 6/1998 Barnes et al.
6,091,374 A 7/2000 Barnes
6,400,329 B1 6/2002 Barnes
6,590,545 B2 * 7/2003 McCorkle .................. 343/830
6,621,462 B2 9/2003 Barnes
6,759,985 B2 * 7/2004 Acher et al. .......... 343/700 MS
6,950,064 B2 * 9/2005 Schantz ..................... 342/427

* cited by examiner

*Primary Examiner*—Tan Ho

(57) ABSTRACT

A chiral polarization UWB slot antenna comprises a feed region and opposing tapered slot lines along an arcuate path of angle measure 360° or less. Opposing tapered slot lines may terminate in bulbous ends and may be characterized by an impedance profile such as an exponential or a Klopfenstein impedance profile. In alternate embodiments, an arcuate path has an arc length substantially equal to a half wavelength at a frequency of interest and an angle measure substantially equal to 180°. In still further alternate embodiments an arcuate path is substantially described by a radial variation with respect to angle of $r(\phi)=R \sin \phi$ where R is a constant that in some embodiments is substantially equal to $1/2\pi$ times wavelength ($R=\lambda/(2\pi)$) at a particular frequency of interest. In some embodiments, a frequency of interest lies substantially within the range defined by 3.1 GHz to 10.6 GHz.

16 Claims, 12 Drawing Sheets

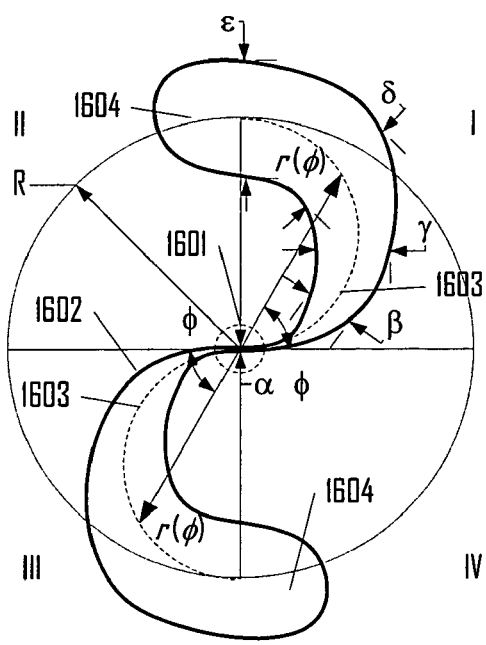
Fig. 16
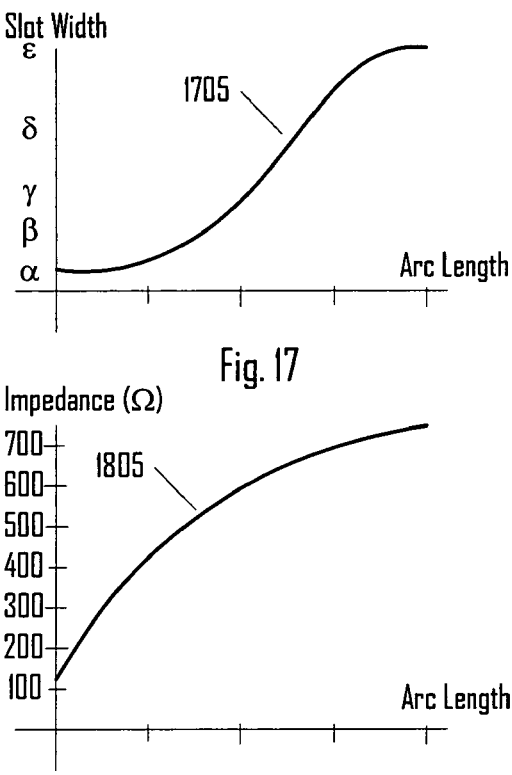
Fig. 17
Fig. 18
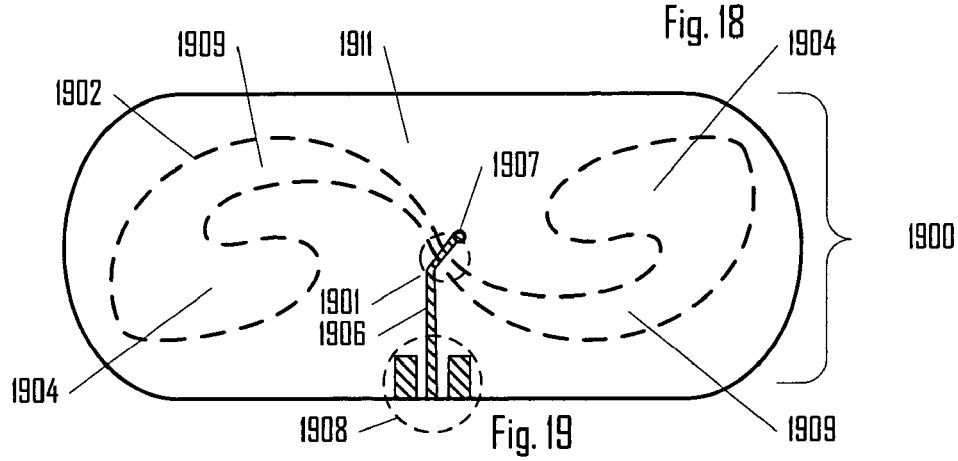
Fig. 19
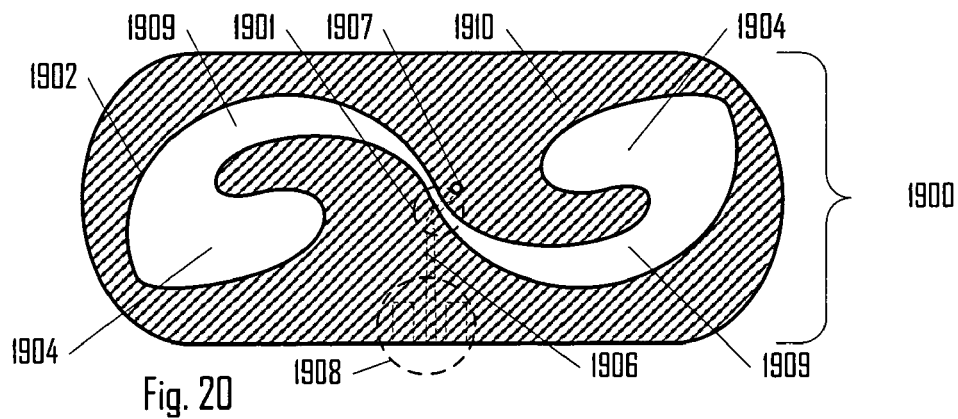
Fig. 20

CHIRAL POLARIZATION ULTRAWIDEBAND SLOT ANTENNA

The present application is a continuation-in-part of a U.S. patent application titled: "System and method for ascertaining angle of arrival of an electromagnetic signal," filed Nov. 14, 2003, Ser. No. 10/714,046, now U.S. Pat. No. 6,950,064, published as Pub. No. US 2004/0239562 A1, by Schantz, which claims the benefit of prior filed Provisional Patent Application Ser. No. 60/433,637, filed Dec. 16, 2002, and claims benefit of prior filed Provisional Patent Application Ser. No. 60/438,724, filed Jan. 8, 2003.

BACKGROUND OF THE INVENTION

The present invention is directed to antennas for use with ultrawideband (UWB) systems, particularly spiral type antennas. Spiral antennas have long been used as frequency independent, "dc-to-daylight" ultrawideband (UWB) antennas. By scaling the spiral geometry over an arbitrarily large range, a spiral antenna may be made sensitive to an arbitrarily large bandwidth.

More recently, there has been interest in ultrawideband antennas to meet the needs of commercial UWB systems compliant with the 3.1-to-10.6 GHz authorization by the Federal Communication Commission. More modern UWB antennas suitable for use with these commercial UWB systems differ from classical "dc-to-daylight" UWB in two important regards.

First, commercial UWB systems must meet a well-defined mask covering about a 3:1 range of frequencies. Unlike classical "dc-to-daylight" UWB antennas for which more bandwidth is always better, modern UWB antennas need just enough bandwidth to enable their corresponding system to meet the regulatory mask. Excessive bandwidth can be detrimental for modern UWB antennas because it opens the RF front end to out of band emitters and worse, makes it more difficult for an associated UWB system to meet the desired mask.

Second, commercial UWB systems should ideally use low dispersion antennas. Classical frequency independent antennas radiate low frequency signals from a large scale section and high frequency signals from a small scale section. This variation in the location of the effective source of radiation can cause dispersion. A dispersive antenna radiates a different signal with different frequency components and phase relationships in different directions. This dispersion can have serious negative impacts on the performance of a UWB system.

At the same time though, spiral antennas have certain characteristics that make them of value for the transmission and reception of UWB signals. Spiral antennas are relatively compact and also radiate and receive mixed or chiral polarization signals.

Thus, there is a need for a spiral antenna with an ultrawideband response but not so broadband as to make compliance with a regulatory mask difficult. There is a further need for a low dispersion spiral antenna.

SUMMARY OF THE INVENTION

A chiral polarization UWB slot antenna comprises a feed region and opposing tapered slot lines along an arcuate path of angle measure 360° or less. Opposing tapered slot lines may terminate in bulbous ends and may be characterized by an impedance profile such as an exponential or a Klopfenstein impedance profile. In alternate embodiments, an arcuate path has an arc length substantially equal to a half wavelength at a frequency of interest and an angle measure substantially equal to 180°. In still further alternate embodiments an arcuate path is substantially described by a radial variation with respect to angle of $r(\phi)=R \sin \phi$ where R is a constant that in some embodiments is substantially equal to $\frac{1}{2}\pi$ times wavelength ($R=\lambda/(2\pi)$) at a particular frequency of interest. In some embodiments, a frequency of interest lies substantially within the range defined by 3.1 GHz to 10.6 GHz.

Alternatively, a chiral polarization UWB slot antenna comprises a substantially symmetric tapered slot that is generally centered around a feed region and generally follows an arcuate path. An arcuate path is preferentially compact, i.e., of angle measure approximately less than or equal to 360° or less. In alternate embodiments an arcuate path has an arc length substantially equal to a half wavelength at a frequency of interest and an angle measure substantially equal to 180°. A substantially symmetric tapered slot may terminate in bulbous ends and may be characterized by an impedance profile such as an exponential or a Klopfenstein impedance profile.

It is, therefore, an object of the present invention to provide a compact spiral antenna for UWB and other applications with a non-dispersive response.

It is a further object of the present invention to provide a UWB antenna capable of radiating and receiving chiral polarization signals.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 16 is a schematic diagram describing a typical spiral slot geometry.

FIG. 17 provides a typical plot of slot width versus arc angle.

FIG. 18 presents a typical plot of impedance versus arc length.

FIG. 19 is a schematic diagram showing a front face of a spiral slot antenna.

FIG. 20 is a schematic diagram showing a back face of a spiral slot antenna.

DETAILED DESCRIPTION OF THE PREFERRED EMBODIMENT

The principle of reciprocity requires that reception and transmission properties of an antenna be reciprocal so that properties of an antenna are the same whether the antenna is employed for receiving signals or is employed for transmitting signals. Throughout this description, it should be kept in mind that discussions relating to transmitting or transmissions apply with equal veracity to reception of electromagnetic energy or signals, and vice versa. In order to avoid prolixity, the present description will focus primarily on reception characteristics of antennas, with the proviso that it is understood that transmission of energy or signals is also inherently described.

Figure 1:
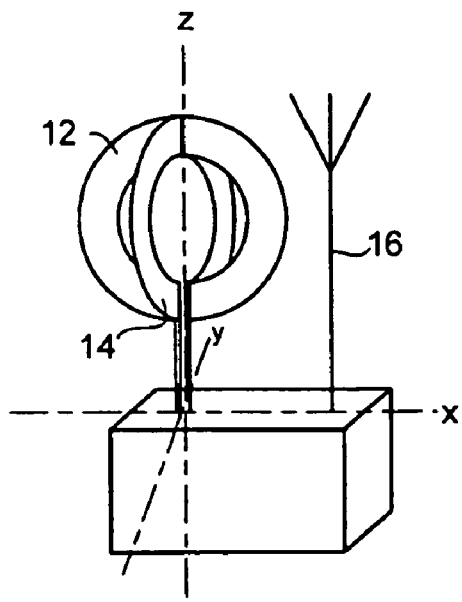
FIG. 1 is a schematic diagram of a representative prior art antenna array useful for radio direction finding operations.

FIG. 1 is a schematic diagram of a representative prior art antenna array useful for radio direction finding operations. In FIG. 1, a radio direction finding antenna array 10 includes a first vertically oriented loop antenna element 12 arranged substantially perpendicular with a first axis "y" and a second vertically oriented loop antenna element 14 arranged substantially perpendicular with a second axis "x". Axes x, y are typically orthogonal axes. Antenna elements 12, 14 intersect at a vertical axis "z" that is perpendicular with axes x, y.

Each of loop antennas 12, 14 has a typical "doughnut" antenna pattern well known to experienced practitioners of the antenna arts. Such a "doughnut" pattern establishes minimal sensitivity to signals arriving along an axis perpendicular with the plane of the antenna element and maximally sensitive along axes lying in the plane of the antenna element. Such an antenna pattern has "front-back ambiguity". Angle of arrival of an electromagnetic signal at such a front-back ambiguous antenna element can only be determined with 180 degree accuracy. To overcome such front-back ambiguity an omnidirectional antenna 16 is typically used with vertical loop antennas 12, 14 to unambiguously indicate whether a sensed signal (not shown in FIG. 1) arrives from the "front" or from the "back" of a respective antenna array.

Figure 2:
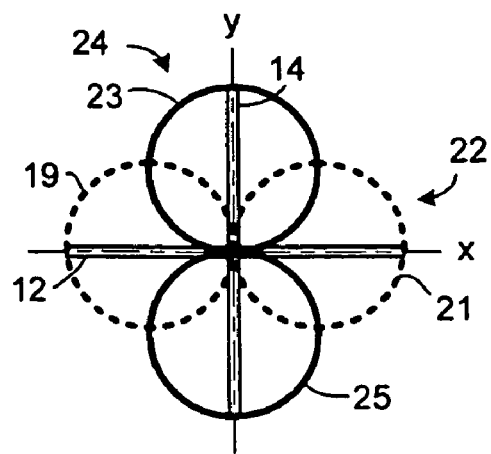
FIG. 2 is a schematic diagram of electromagnetic signal patterns associated with operating the orthogonal loop antennas illustrated in FIG. 1.

FIG. 2 is a schematic diagram of electromagnetic signal patterns associated with operating the orthogonal loop antennas illustrated in FIG. 1. In FIG. 2, antenna elements 12, 14 are shown in a top view with their associated axes x, y. Antenna pattern 22 is a planar section of the antenna pattern of antenna element 12. Antenna pattern 22 includes loops 19, 21. Antenna pattern 24 is a planar section of the antenna pattern of antenna element 14. Antenna pattern 24 includes loops 23, 25. Planar antennas, such as planar loop antennas 12, 14, are maximally sensitive to signals in the plane of the loop, and minimally sensitive to signals incident along the axis of the loop. That is, antenna element 12 is minimally sensitive to signals arriving along axis y, and antenna element 14 is minimally sensitive to signals arriving along axis x. Antenna patterns 22, 24 are mathematically expressed for two dimensions in the x,y plane as:

$$P(\phi)=\cos^2 \phi \quad [1]$$

where, $\phi$=angle of arrival in the x,y plane.

$$P(\phi)=\sin^2 \phi \quad [2]$$

where, $\phi$=angle of arrival in the x,y plane.

Antenna patterns 22, 24 may be weightingly summed to create a virtual loop antenna pattern (not shown in FIG. 2) oriented in any direction in the x,y plane. Such "steering" of the response patterns of antenna elements 12, 14 permits maximizing or minimizing a received signal to ascertain its angle of arrival at antenna elements 12, 14.

Another prior art arrangement for ascertaining angle of arrival of electromagnetic signals at antenna elements 12, 14 is to effect amplitude comparison of signals received at antenna elements 12, 14 and employing the relationship:

$$\varphi = \tan^{-1} \frac{|A_2|}{|A_1|} \quad [3]$$

Expression [3] will only yield a magnitude for a value of angle of arrival $\phi$. That is, expression [3] can only produce a solution within a 180 degree range; it describes antenna elements 12, 14 with "front-back ambiguity". It is for this reason that sense antenna 16 (FIG. 1) is employed with radio direction finding antenna array 10 (FIG. 1). An omnidirectional antenna 16 operates as a sense antenna to provide directional input to the solution provided by expression [3], thereby resolving the front-back ambiguity suffered by antenna elements 12, 14. An omnidirectional antenna may be thought of as providing a sign for the solution of expression [3] to enable determination of angle of arrival of signals at antenna elements 12, 14 for a full 360 degree range.

A consequence of the requirement for both loop antennas 12, 14 and an omnidirectional antenna 16 for implementing prior art radio direction finding techniques is that apparatuses such as radio direction finding antenna apparatus 10 are bulky. In the present market, smaller apparatuses are sought, so it is advantageous to be able to accomplish required operations using more compact apparatuses. There is a need for a compact apparatus for effecting radio direction finding operations to ascertain angle of arrival of electromagnetic signals at an antenna.

The present invention provides significant improvements over prior art radio direction finding apparatuses and methods in ascertaining angle of arrival of electromagnetic signals. The present invention employs a characteristic electromagnetic signal. For purposes of this application a characteristic electromagnetic signal has at least one signal characteristic that experiences inversion or another detectable change when the signal is received by various portions of an antenna element. By way of example and not by way of limitation, a signal characteristic may include phase, polarization, or amplitude. Also by way of example and not by way of limitation, a characteristic electromagnetic signal may be a broadband electromagnetic signal having a characteristic Gaussian doublet type waveform in the time domain. Such Gaussian doublet waveforms are recognizable as having either an upright (or positive) orientation or an inverted (or negative) orientation. Further, such Gaussian doublet waveforms are known to exhibit 180 degree inversion in signals received or transmitted by a first half-plane of a planar loop antenna element compared with signals received or transmitted by a second half-plane of a planar loop antenna. For purposes of this application, the term "broadband signal" refers to a signal having a sufficiently broad bandwidth to permit detection of a change in a signal characteristic of an electromagnetic signal interacting with (i.e., received or transmitted by) an antenna element. For purposes of this application, the term "broadband antenna" refers to an antenna signal having a sufficiently broad signal response to permit detection of a change in a signal characteristic of an electromagnetic signal interacting with (i.e., received or transmitted by) the antenna element.

Figure 3:
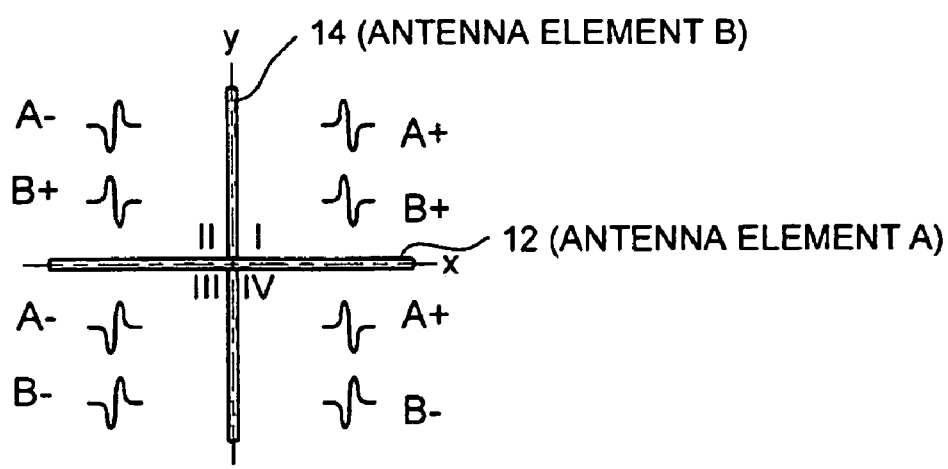
FIG. 3 is a schematic diagram illustrating patterns of waveform inversions related to quadrant of arrival of an electromagnetic signal at an orthogonal loop antenna of the type illustrated in FIG. 1.

FIG. 3 is a schematic diagram illustrating patterns of waveform inversions related to quadrant of arrival of an electromagnetic signal at an orthogonal loop antenna of the type illustrated in FIG. 1. In FIG. 3, antenna elements 12, 14 (FIG. 1) are shown in a top view with their associated axes x, y. A broadband electromagnetic signal containing a Gaussian doublet is received by antenna elements 12, 14. Antenna elements 12, 14 establish sectors or quadrants I, II, III, IV. For purposes of succinctly describing operation of the apparatus illustrated in FIG. 3, antenna element 12 will be referred to as ANTENNA ELEMENT A and antenna element 14 will be referred to as ANTENNA ELEMENT B.

FIG. 3 presumes that an exemplary electromagnetic signal is received by each of ANTENNA ELEMENT A and ANTENNA ELEMENT B in quadrant I as an upright (positive) signal characteristic. Thus in FIG. 3, quadrant I indicates that ANTENNA ELEMENT A receives a positive Gaussian doublet (indicated as A+) and ANTENNA ELEMENT B receives a positive Gaussian doublet (indicated as B+).

Quadrant II lies on a different side of axis y than quadrant I; that is quadrant II is in a different half-plane of ANTENNA ELEMENT A than quadrant I. It is for this reason that the Gaussian doublet of the electromagnetic signal received (or transmitted) by ANTENNA ELEMENT A is inverted (negative) in quadrant II (indicated as A−). In contrast, quadrant II lies on the same side of axis x as quadrant I; that is, quadrant II is in the same half plane of ANTENNA ELEMENT B as quadrant I. It is for this reason that the Gaussian doublet of the electromagnetic signal received (or transmitted) by ANTENNA ELEMENT B is upright (positive) in quadrant II (indicated as B+).

Quadrant III lies on a different side of axis y than quadrant I; that is quadrant II is in a different half-plane of ANTENNA ELEMENT A than quadrant I. It is for this reason that the Gaussian doublet of the electromagnetic signal received (or transmitted) by ANTENNA ELEMENT A is inverted (negative) in quadrant III (indicated as A−). Quadrant III lies on a different side of axis x as quadrant I; that is, quadrant III is in a different half plane of ANTENNA ELEMENT B as quadrant I. It is for this reason that the Gaussian doublet of the electromagnetic signal received (or transmitted) by ANTENNA ELEMENT B is inverted (negative) in quadrant III (indicated as B−).

Quadrant IV lies on the same side of axis y as quadrant I; that is quadrant IV is in the same half-plane of ANTENNA ELEMENT A as quadrant I. It is for this reason that the Gaussian doublet of the electromagnetic signal received (or transmitted) by ANTENNA ELEMENT A is upright (positive) in quadrant IV (indicated as A+). In contrast, quadrant IV lies on a different side of axis x as quadrant I; that is, quadrant IV is in a different half plane of ANTENNA ELEMENT B as quadrant I. It is for this reason that the Gaussian doublet of the electromagnetic signal received (or transmitted) by ANTENNA ELEMENT B is inverted (negative) in quadrant IV (indicated as B−).

Thus, each respective sector or quadrant I, II, III, IV is uniquely identified by the characteristic Gaussian doublet of the received (or transmitted) electromagnetic signal. Thus, ascertaining the combination of states of Gaussian doublets of the received (or transmitted) electromagnetic signal by each of ANTENNA ELEMENTS A, B permits ascertaining angle of arrival of the electromagnetic signal at least to a resolution of one quadrant I, II, III, IV.

A radio transmission and reception system for use in conjunction with the present invention may benefit from employing an original transmit broadband signal with a reference: a predetermined signal characteristic or combination of signal characteristics employed as a reference signal. Such a reference may assist a receiver in distinguishing which of a first or second state is indicated.

Figure 4:
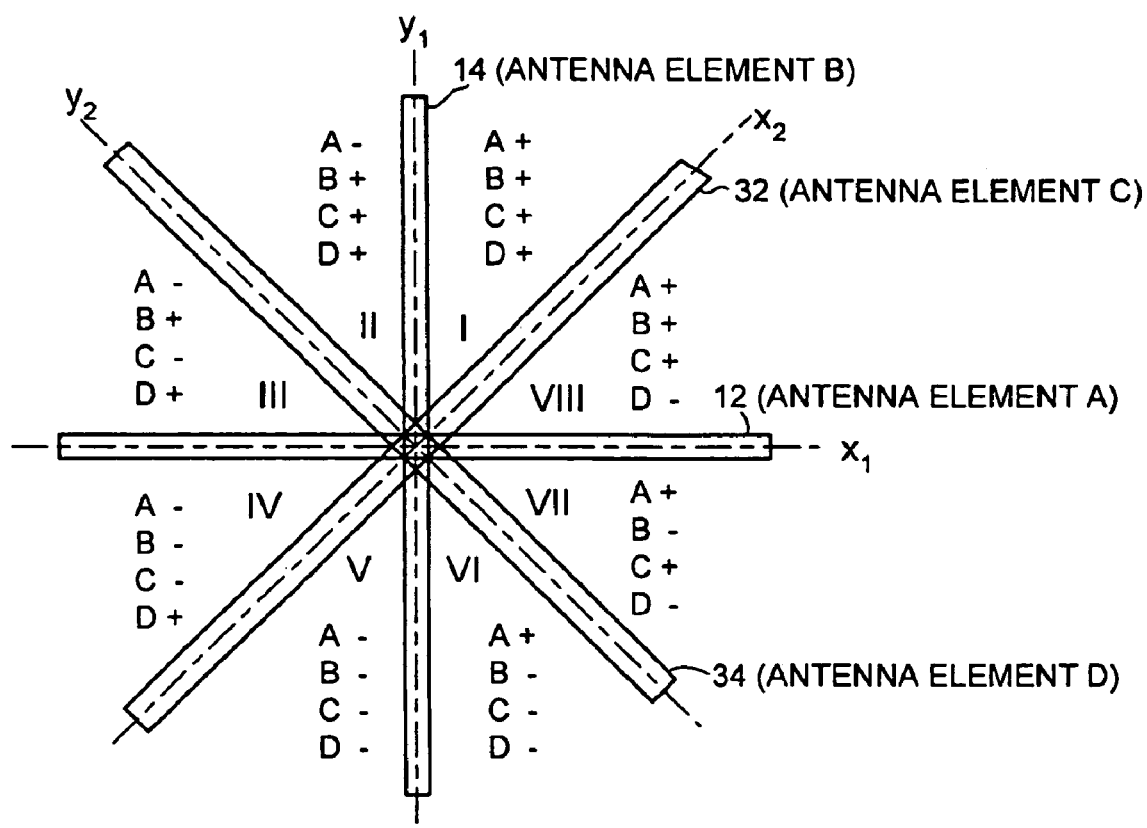
FIG. 4 is a schematic diagram illustrating patterns of waveform inversions related to sector of arrival of an electromagnetic signal at a multi-element antenna apparatus.

FIG. 4 is a schematic diagram illustrating patterns of waveform inversions related to sector of arrival of an electromagnetic signal at a multi-element antenna apparatus. In FIG. 4, antenna elements 12, 14 are shown in a top view with their associated axes $x_1$, $y_1$, and antenna elements 32, 34 are shown in a top view with their associated axes $x_2$, $y_2$. Preferably plane $x_1$, $y_1$ is substantially coincident with plane $x_2$, $y_2$. A broadband electromagnetic signal containing a Gaussian doublet is received by antenna elements 12, 14, 32, 34. Antenna elements establish sectors I, II, III, IV, V, VI, VII, VIII. For purposes of succinctly describing operation of the apparatus illustrated in FIG. 4, antenna element 12 will be referred to as ANTENNA ELEMENT A, antenna element 14 will be referred to as ANTENNA ELEMENT B, antenna element 32 will be referred to as ANTENNA ELEMENT C and antenna element 34 will be referred to as ANTENNA ELEMENT D.

FIG. 4 presumes that an exemplary electromagnetic signal is received by each of ANTENNA ELEMENT A, ANTENNA ELEMENT B, ANTENNA ELEMENT C and ANTENNA ELEMENT D in sector I as an upright (positive) signal characteristic. Gaussian doublets are indicated in FIG. 4 with a notation as to the respective antenna element receiving the electromagnetic signal (i.e., ANTENNA ELEMENT A, B, C, or D) and an indication whether the respective Gaussian doublet is upright (i.e., positive; +) or inverted (i.e., negative; −). Thus in FIG. 4, sector I indicates that ANTENNA ELEMENT A receives a positive Gaussian doublet (indicated as A+), ANTENNA ELEMENT B receives a positive Gaussian doublet (indicated as B+), ANTENNA ELEMENT C receives a positive Gaussian doublet (indicated as C+) and ANTENNA ELEMENT D receives a positive Gaussian doublet (indicated as D+).

Sector II lies on a different side of axis $y_1$ than sector I; that is sector II is in a different half-plane of ANTENNA ELEMENT A than sector I. It is for this reason that the Gaussian doublet of the electromagnetic signal received (or transmitted) by ANTENNA ELEMENT A is inverted (negative) in sector II (indicated as A−). In contrast, sector II lies on the same side of axis $x_1$ as sector I; sector II lies on the same side of axis $y_2$ as sector I; and sector II lies on the same side of axis $x_2$ as sector I. That means that sector II is in the same half-plane of ANTENNA ELEMENT B as sector I, sector II is in the same half plane of ANTENNA ELEMENT C as sector I and sector II is in the same half plane of ANTENNA ELEMENT D as sector I. It is for this reason that the Gaussian doublets of the electromagnetic signal received (or transmitted) by ANTENNA ELEMENT B, ANTENNA ELEMENT C and ANTENNA ELEMENT D are upright (positive) in sector II (indicated as B+, C+, D+).

Sector III lies on a different side of axis $y_1$ than sector I, and sector III lies on a different side of axis $y_2$ than sector II. That is, sector III is in a different half-plane of ANTENNA ELEMENT A than sector I, and sector III is in a different half-plane of ANTENNA ELEMENT C than sector II. It is for this reason that the Gaussian doublet of the electromagnetic signal received (or transmitted) by ANTENNA ELEMENT A is inverted (negative) in sector III (indicated as A−) and the Gaussian doublet of the electromagnetic signal received (or transmitted) by ANTENNA ELEMENT C is inverted (negative) in sector III (indicated as C−). In contrast, sector III lies on the same side of axis $x_1$ as sectors I and II, and sector III lies on the same side of axis $x_2$ as sectors I and II. That means that sector III is in the same half-plane of ANTENNA ELEMENT B as sectors I and II, and sector III is in the same half plane of ANTENNA ELEMENT D as sectors I and II. It is for this reason that the Gaussian doublets of the electromagnetic signal received (or transmitted) by ANTENNA ELEMENT B and ANTENNA ELEMENT D are upright (positive) in sector III (indicated as B+, C+).

Sector IV lies on a different side of axis $y_1$ than sector I; sector IV lies on a different side of axis $x_1$ than sectors I, II and III; and sector IV lies on a different side of axis $y_2$ than sectors I and II. That is, sector IV is in a different half-plane of ANTENNA ELEMENT A than sector I; sector IV is in a different half-plane of ANTENNA ELEMENT B than sectors I, II and III; and sector IV is in a different half-plane of ANTENNA ELEMENT C than sectors I and II. It is for this reason that the Gaussian doublet of the electromagnetic signal received (or transmitted) by ANTENNA ELEMENT A is inverted (negative) in sector IV (indicated as A−), the Gaussian doublet of the electromagnetic signal received (or transmitted) by ANTENNA ELEMENT B is inverted (negative) in sector IV (indicated as B−) and the Gaussian doublet of the electromagnetic signal received (or transmitted) by ANTENNA ELEMENT C is inverted (negative) in sector IV (indicated as C−). In contrast, sector IV lies on the same side of axis $x_2$ as sectors I, II and III. That means that sector IV is in the same half-plane of ANTENNA ELEMENT D as sectors I, II and III. It is for this reason that the Gaussian doublet of the electromagnetic signal received (or transmitted) by ANTENNA ELEMENT D is upright (positive) in sector IV (indicated as D+).

Sector V lies on a different side of axis $y_1$ than sector I; sector V lies on a different side of axis $x_1$ than sectors I, II and III; sector V lies on a different side of axis $y_2$ than sectors I and II; and sector V lies on a different side of axis $x_2$ than sectors I and II. That is, sector V is in a different half-plane of ANTENNA ELEMENT A than sector I; sector V is in a different half-plane of ANTENNA ELEMENT B than sectors I, II and III; sector V is in a different half-plane of ANTENNA ELEMENT C than sectors I and II; and sector V is in a different half-plane of ANTENNA ELEMENT D than sectors I, II, III and IV. It is for this reason that the Gaussian doublet of the electromagnetic signal received (or transmitted) by ANTENNA ELEMENT A is inverted (negative) in sector V (indicated as A−), the Gaussian doublet of the electromagnetic signal received (or transmitted) by ANTENNA ELEMENT B is inverted (negative) in sector V (indicated as B−), the Gaussian doublet of the electromagnetic signal received (or transmitted) by ANTENNA ELEMENT C is inverted (negative) in sector V (indicated as C−) and the Gaussian doublet of the electromagnetic signal received (or transmitted) by ANTENNA ELEMENT D is inverted (negative) in sector V (indicated as D−). Sector V does not lie in any same half-plane of any of ANTENNA ELEMENT A, ANTENNA ELEMENT B, ANTENNA ELEMENT C, ANTENNA ELEMENT D as sectors I. It is for this reason that none of the Gaussian doublets received (or transmitted) by ANTENNA ELEMENT A, ANTENNA ELEMENT B, ANTENNA ELEMENT C, ANTENNA ELEMENT D is upright (positive) in sector V.

Sector VI lies on a different side of axis $x_1$ than sectors I, II and III; sector VI lies on a different side of axis $y_2$ than sectors I and II; and sector VI lies on a different side of axis $x_2$ than sectors I, II, III and IV. That is, sector VI is in a different half-plane of ANTENNA ELEMENT B than sectors I, II and III; sector VI is in a different half-plane of ANTENNA ELEMENT C than sectors I and II; and sector VI is in a different half-plane of ANTENNA ELEMENT D than sectors I, II, III and IV. It is for this reason that the Gaussian doublet of the electromagnetic signal received (or transmitted) by ANTENNA ELEMENT B is inverted (negative) in sector VI (indicated as B−), the Gaussian doublet of the electromagnetic signal received (or transmitted) by ANTENNA ELEMENT C is inverted (negative) in sector VI (indicated as C−) and the Gaussian doublet of the electromagnetic signal received (or transmitted) by ANTENNA ELEMENT D is inverted (negative) in sector VI (indicated as D−). In contrast, sector VI lies on the same side of axis $y_1$ as sector I. That means that sector VI is in the same half-plane of ANTENNA ELEMENT A as sector I. It is for this reason that the Gaussian doublet of the electromagnetic signal received (or transmitted) by ANTENNA ELEMENT A is upright (positive) in sector VI (indicated as A+).

Sector VII lies on a different side of axis $x_1$ than sectors I, II and III; and sector VII lies on a different side of axis $x_2$ than sectors I, II, III and IV. That is, sector VII is in a different half-plane of ANTENNA ELEMENT B than sectors I, II and III; and sector VII is in a different half-plane of ANTENNA ELEMENT D than sectors I, II, III and IV. It is for this reason that the Gaussian doublet of the electromagnetic signal received (or transmitted) by ANTENNA ELEMENT B is inverted (negative) in sector VII (indicated as B−) and the Gaussian doublet of the electromagnetic signal received (or transmitted) by ANTENNA ELEMENT D is inverted (negative) in sector VII (indicated as D−). In contrast, sector VII lies on the same side of axis $y_1$ as sector I, and sector VII lies on the same side of axis $y_2$ as sectors I and II. That means that sector VII is in the same half-plane of ANTENNA ELEMENT A as sector I, and sector VII is in the same half-plane of ANTENNA ELEMENT C as sectors I and II. It is for this reason that the Gaussian doublet of the electromagnetic signal received (or transmitted) by ANTENNA ELEMENT A is upright (positive) in sector VII (indicated as A+) and the Gaussian doublet of the electromagnetic signal received (or transmitted) by ANTENNA ELEMENT C is upright (positive) in sector VII (indicated as C+).

Sector VIII lies on a different side of axis $x_2$ than sectors I, II, III and IV. That is, sector VIII is in a different half-plane of ANTENNA ELEMENT D than sectors I, II, III and IV. It is for this reason that the Gaussian doublet of the electromagnetic signal received (or transmitted) by ANTENNA ELEMENT D is inverted (negative) in sector VIII (indicated as D−). In contrast, sector VIII lies on the same side of axis $y_1$ as sectors I, VI, VII and VIII; sector VIII lies on the same side of axis $x_1$ as sectors I, II and III; and sector VIII lies on the same side of axis $y_2$ as sectors I and VII. That means that sector VIII is in the same half-plane of ANTENNA ELEMENT A as sectors I, VI, VII and VIII; sector VIII is in the same half-plane of ANTENNA ELEMENT B as sectors I, II and III; and sector VIII is in the same half-plane of ANTENNA ELEMENT C as sectors I, II and VII. It is for this reason that the Gaussian doublet of the electromagnetic signal received (or transmitted) by ANTENNA ELEMENT A is upright (positive) in sector VIII (indicated as A+), the Gaussian doublet of the electromagnetic signal received (or transmitted) by ANTENNA ELEMENT B is upright (positive) in sector VIII (indicated as B+) and the Gaussian doublet of the electromagnetic signal received (or transmitted) by ANTENNA ELEMENT C is upright (positive) in sector VIII (indicated as C+).

Thus, each respective sector I, II, III, IV, V, VI, VII, VIII is uniquely identified by the characteristic Gaussian doublet of the received (or transmitted) electromagnetic signal. Thus, ascertaining the combination of states of Gaussian doublets of the received (or transmitted) electromagnetic signal by each of ANTENNA ELEMENTS A, B, C, D permits ascertaining angle of arrival of the electromagnetic signal at least to a resolution of one quadrant I, II, III, IV, V, VI, VII, VIII.

Figure 5:
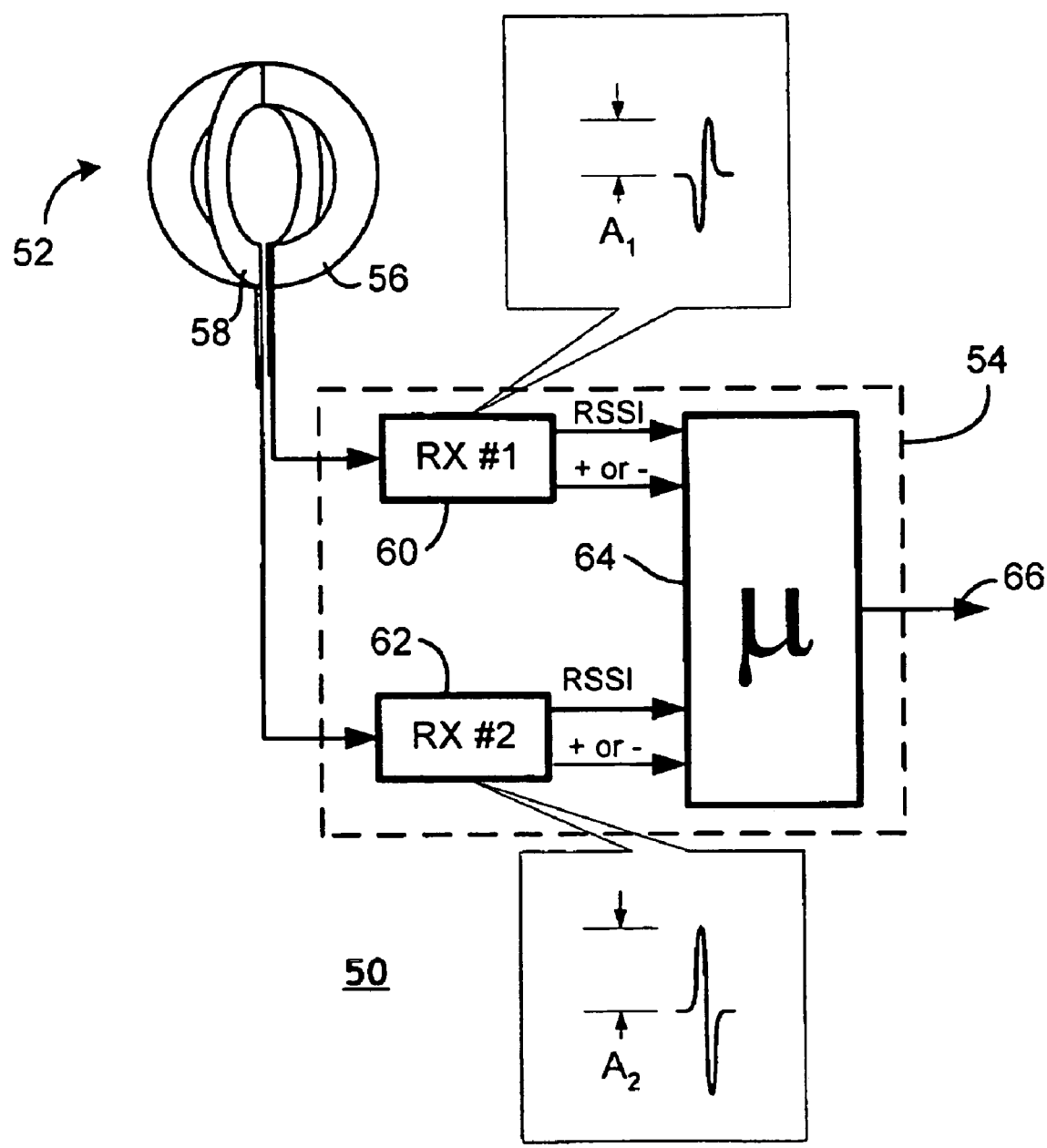
FIG. 5 is a schematic diagram illustrating details of the preferred embodiment of an evaluation apparatus useful in the system of the present invention.

FIG. 5 is a schematic diagram illustrating details of the preferred embodiment of an evaluation apparatus useful in the system of the present invention. In FIG. 5, a direction finding system 50 includes an antenna array 52 and an evaluation apparatus 54. Antenna array 52 includes a first antenna element 56 and a second antenna element 58. Antenna elements 56, 58 are shown as planar loop antennas. A wide variety of other antennas are suitable for use in antenna array 52. One advantage of planar loop antennas, however, is that such antennas may be made arbitrarily small, limited only by a sensitivity of receiver units 60, 62 in properly detecting signals from antenna elements 56, 58. Thus, an antenna array 52 may be made very compact.

Evaluation apparatus 54 includes a first receiver unit 60, a second receiver unit 62 and a processor unit 64. First receiver unit 60 is coupled with one antenna element 56, 58 and second receiver unit 62 is coupled with another antenna element 56, 58 than is coupled with first antenna element 60. Each of receiver units 60, 62 provides information relating to signals received from its respective coupled antenna element 56, 58 to processor unit 64. Preferably, receiver unit 60, 62 provide information relating to signal amplitude or strength (e.g., RSSI; Received Signal Strength Indication) and signal orientation (e.g., Gaussian doublet upright [+] or inverted [−]) information.

Processing unit 64 employs predetermined relationships, preferably algorithmic relationships, for determining in which sector (FIG. 3) the signal arrived (or was transmitted). Processor unit 64 may interpret the combination of orientations of Gaussian doublets received by antenna elements 56, 58 to ascertain in which sector the signal arrived. In the representative situation illustrated in FIG. 5, first receiver unit 60 receives a first signal from antenna element 56 that has an amplitude $A_1$ and is an inverted Gaussian doublet. Second receiver unit 62 receives a second signal from antenna element 58 that has an amplitude $A_2$ and is an upright Gaussian doublet. By such determinations, processor unit 64 may ascertain angle of arrival of a signal at direction finding system 50 to a resolution of one sector (FIG. 3). Further, by comparing signal amplitudes of arriving signals, processor unit 64 may ascertain which arriving signals are directly received from a distal transmitter and which signals are received along a multi-path route having reflected off of an obstacle such as a building or other structure en route from the distal transmitter to direction finding system 50. Processor unit 64 presents an output signal at an output locus 66 to indicate conclusions regarding signals arriving at antenna elements 56, 58.

Figure 6:
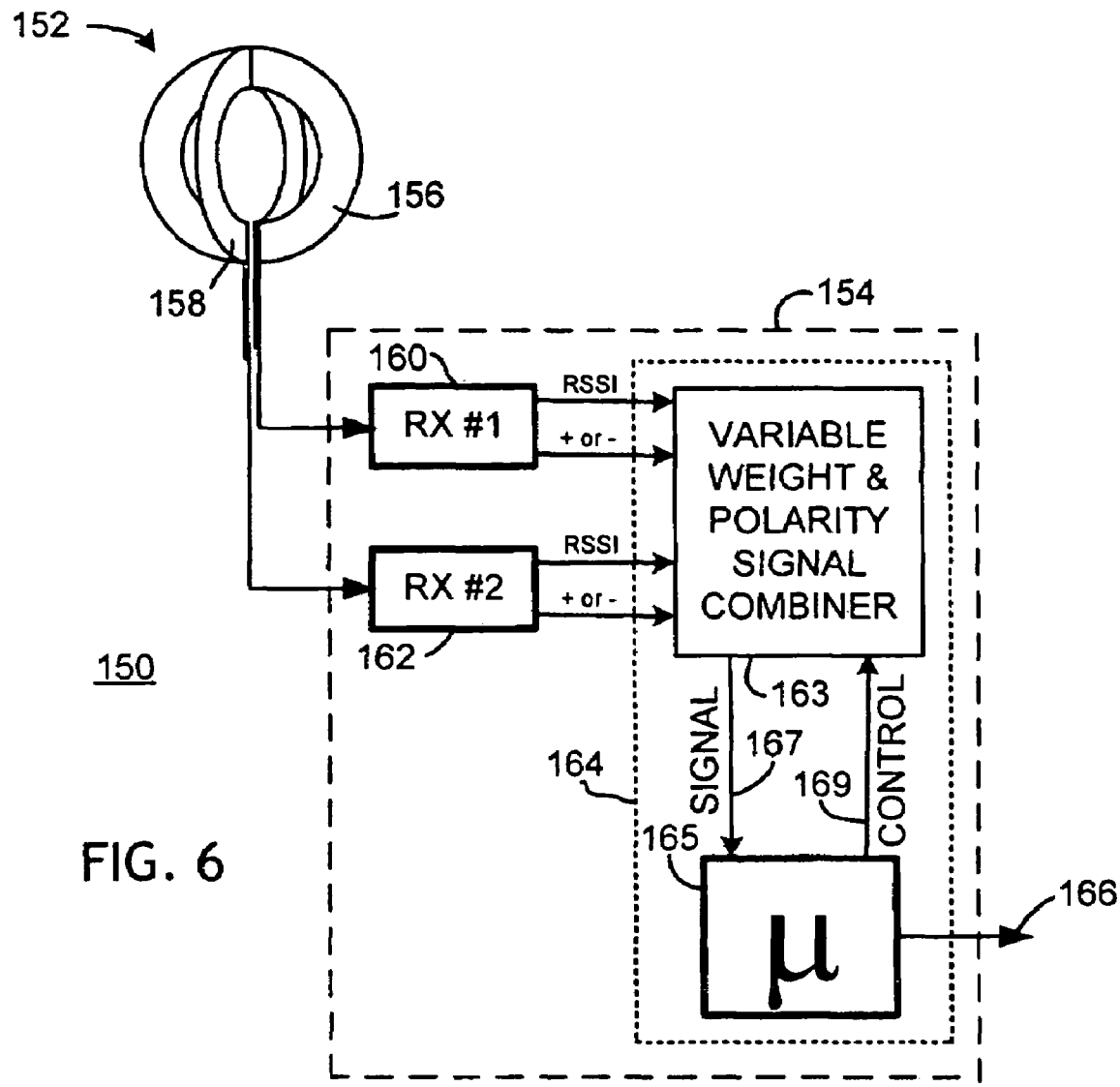
FIG. 6 is a schematic diagram illustrating details of a first alternate embodiment of an evaluation apparatus useful in the system of the present invention.

FIG. 6 is a schematic diagram illustrating details of a first alternate embodiment of an evaluation apparatus useful in the system of the present invention. In FIG. 6, a location aware radio receiver system 150 includes an antenna array 152 and an evaluation apparatus 154. Antenna array 152 includes a first antenna element 156 and a second antenna element 158.

Evaluation apparatus 154 includes a first receiver unit 160, a second receiver unit 162 and a processor unit 164. First receiver unit 160 is coupled with one of antenna elements 156, 158 and second receiver unit 162 is coupled with another of antenna elements 156, 158. Each of receiver units 160, 162 provides information relating to signals received from its respective coupled antenna element 156, 158 to processor unit 164. Preferably, receiver units 160, 162 provide information relating to signal amplitude or strength (e.g., RSSI; Received Signal Strength Indication) and signal orientation (e.g., Gaussian doublet upright [+] or inverted [−]) information.

Processing unit 64 includes a signal combiner unit 163 coupled with a processor 165. Signal combiner unit 163 combines signals received from receiver units 160, 162 according to assigned weight factors and polarity factors. Weight factors and polarity factors are determined according to predetermined relationships, such as algorithmic relationships, using information conveyed by receiver units 160, 162 relating to then extant signals received by antenna elements 156, 158. A signal relating the combined signal information is conveyed to processor 165, as indicated by arrow 167. Processor 165 evaluates information provided by signals received from combiner unit 163 and provides control signals, as indicated by arrow 169, to combiner unit 163 to adjust factors such as weights applied to signals received from receiver units 160, 162. It is by such adjustment of weight factors, for example, that permits location aware radio receiver system 150 to be electronically steered to concentrate upon selected signals. Evaluation of features of received signals, such as amplitude or timing (when a means is provided for determining timing) permit processor 165, for example, to ascertain which signals are directly received from a distal transmitter and which signals are received along a multi-path route having reflected off of an obstacle such as a building or other structure en route from the distal transmitter to location aware radio receiver system 150. Determining timing may be effected, by way of example and not by way of limitation, by feedback from location aware radio receiver system 150 to a transmitter reporting time of arrival of an identifiable signal, or by receipt of a timing signal with received signals or by another independent time-determining arrangement. Processor 165 employs predetermined relationships, preferably algorithmic relationships, for determining in which sector (FIG. 3) the signal arrived (or was transmitted). Processor 165 may interpret the combination of orientations of Gaussian doublets received by antenna elements 156, 158 to ascertain in which sector the signal arrived. By such determinations, processor 165 may ascertain angle of arrival of a signal at location aware radio receiver system 150 to a resolution of one sector (FIG. 3). Further, by electronically steering location aware radio receiver system 150 as described above by adjusting weights assigned to received signals, location aware radio receiver system 150 may ignore multi-path signals and concentrate reception toward direct signals. Processor unit 164 presents an output signal at an output locus 166 to indicate conclusions regarding signals arriving at antenna elements 156, 158.

Figure 7:
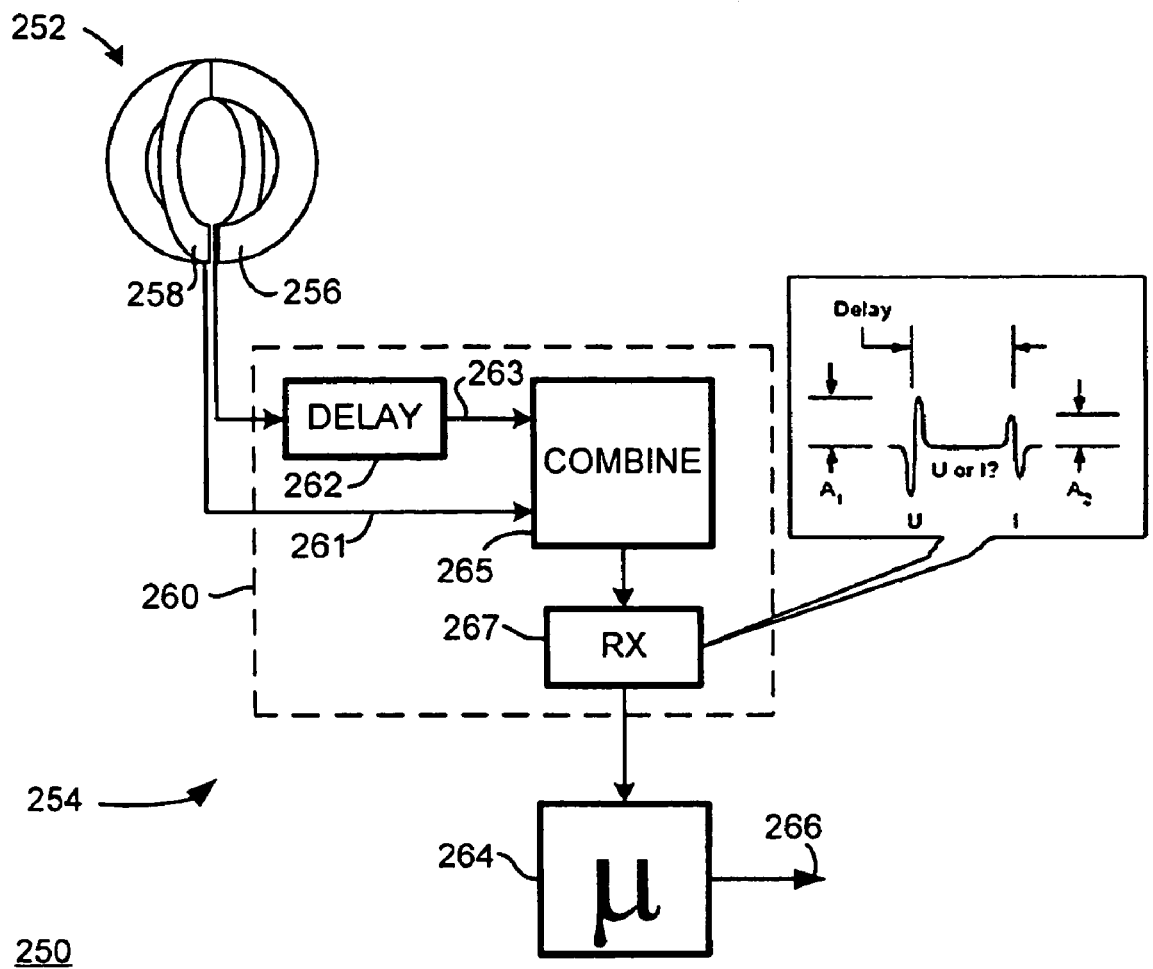
FIG. 7 is a schematic diagram illustrating details of a second alternate embodiment of an evaluation apparatus useful in the system of the present invention.

FIG. 7 is a schematic diagram illustrating details of a second alternate embodiment of an evaluation apparatus useful in the system of the present invention. In FIG. 7, a direction finding system 250 includes an antenna array 252 and an evaluation apparatus 254. Antenna array 252 includes a first antenna element 256 and a second antenna element 258.

Evaluation apparatus 254 includes a receiver unit 260 and a processor unit 264. Receiver unit 260 includes a signal delay unit 262, a signal combining unit 265 and a receiver 267.

Signal delay unit 262 is coupled with antenna element 256 and with combining unit 265. Combining unit 265 is also coupled with antenna element 258. Signal delay unit 265 imposes a delay on signals received from antenna element 256 and provides those delayed signals to combining unit 265. Combining unit 265 combines delayed signals received from signal delay unit 265 and real-time or non-delayed signals received from antenna element 258 to present a signal stream to receiver 267. In the exemplary embodiment of the invention illustrated in FIG. 7, receiver 267 receives a signal stream including a first signal from antenna element 258 that has an amplitude $A_1$ and is a noninverted (U, or +) Gaussian doublet and including a second signal (received from antenna element 256) that is delayed in time with respect to the signal received by antenna element 258. The second delayed signal has an amplitude $A_2$ and is an inverted (I or −) Gaussian doublet. Receiver 267 provides the signal stream containing real-time and delayed signals to processor unit 264. Preferably, receiver 267 provides information relating to signal amplitude or strength (e.g., RSSI; Received Signal Strength Indication) and signal orientation (e.g., Gaussian doublet upright [+] or inverted [−]) information to processor unit 264.

Processor unit 64 employs predetermined relationships, preferably algorithmic relationships, for determining in which sector (FIG. 3) the signal arrived (or was transmitted). Processor unit 264 may interpret the combination of orientations of Gaussian doublets received by antenna elements 256, 258 to ascertain in which sector the signal arrived. By such determinations, processor unit 264 may ascertain angle of arrival of a signal at direction finding system 250 to a resolution of one sector (FIG. 3). Further, by comparing signal amplitudes of arriving signals, processor unit 264 may ascertain which arriving signals are directly received from a distal transmitter and which signals are received along a multi-path route having reflected off of an obstacle such as a building or other structure en route from the distal transmitter to direction finding system 250. Processor unit 264 presents an output signal at an output locus 266 to indicate conclusions regarding signals arriving at antenna elements 256, 258.

Figure 8:
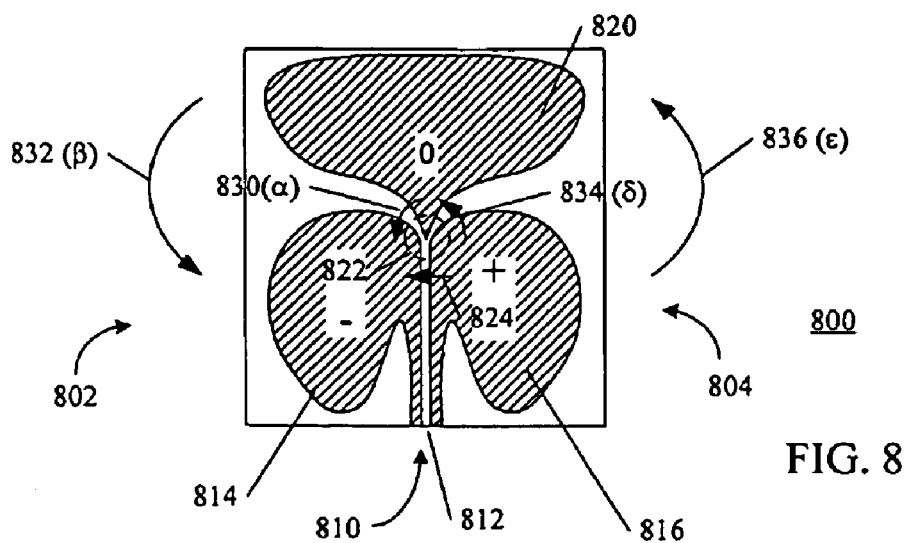
FIG. 8 illustrates a planar antenna for use with the present invention.

FIG. 8 illustrates a planar antenna for use with the present invention. In FIG. 8, an antenna 800 presents a two lobe or "quadrupole" type pattern in which each lobe 802, 804 has a field sense opposite to the other. Antenna 800 has a differential feed 810 that is formed by a slot 812 between a minus (−) element 814 in lobe 802 and a plus (+) element 816 in lobe 804. Differential feed 810 terminates at a neutral element 820 in a feed region 822. The combination of minus (−) element 814, plus (+) element 816 and neutral element 820 at feed region 822 acts so as split a signal with a polarity denoted by arrow 824 into two signals of opposing polarity: a first signal 830 of polarity α that becomes a radiated signal 832 of polarity β and a second signal 834 of polarity δ that becomes a radiated signal 836 of polarity ε. For ease of explanation, the behavior of a planar antenna of FIG. 8 is explained in terms of radiation with lobe 802 having polarity β and lobe 804 having polarity δ. Antenna 800 may also be used for reception.

Figure 9:
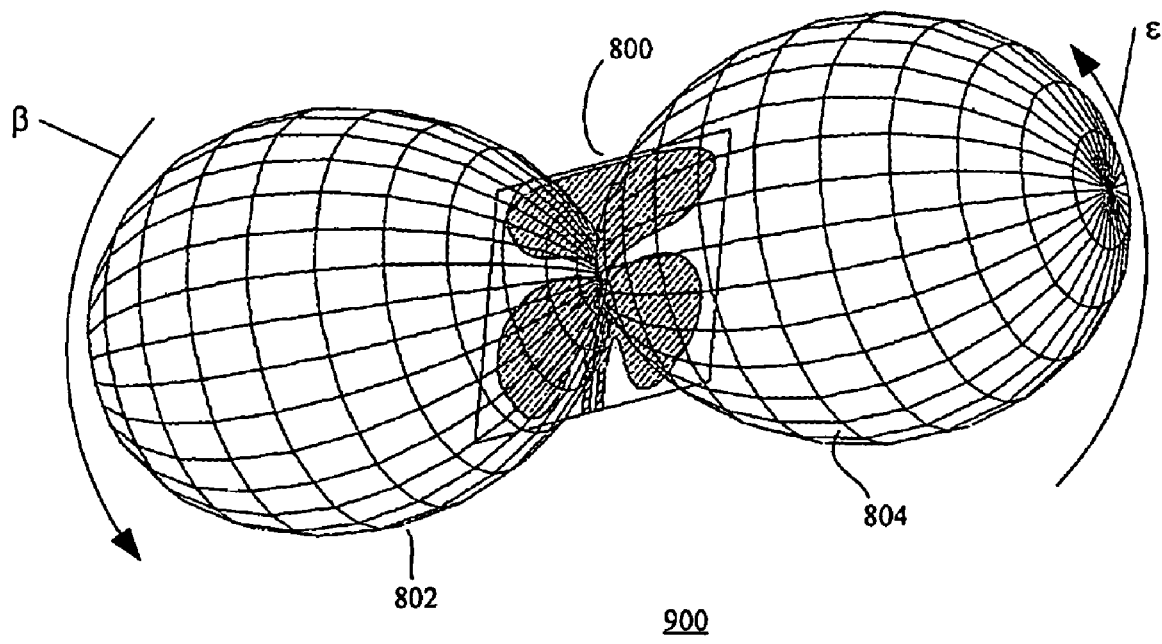
FIG. 9 illustrates a representative signal pattern of the antenna of FIG. 8.

FIG. 9 illustrates a representative signal pattern of the antenna of FIG. 8. In FIG. 9, a signal pattern 900 is established by antenna 800. Signal pattern 900 is a two lobe or "quadrupole" type pattern in which each lobe 802, 804 has a field sense or polarity β, ε opposite to the other. Because this pattern is insensitive in directions not substantially lying on an azimuthal plane, the pattern is characterized by a higher gain than the dipole doughnut pattern of a loop antenna.

Figure 10:
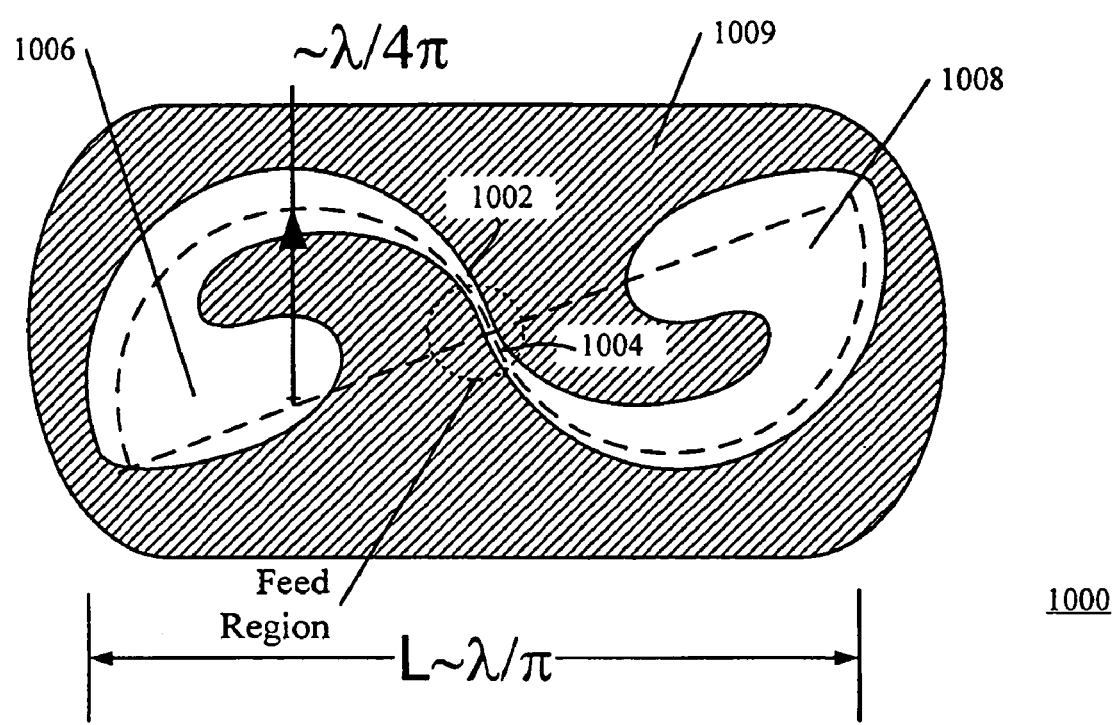
FIG. 10 illustrates a novel chiral polarization UWB slot antenna.

FIG. 10 illustrates a novel chiral polarization UWB slot antenna. In FIG. 10, a chiral polarization ultra-wide band ("UWB") slot antenna 1000 is suitable for many applications, including for use in conjunction with the present invention. Chiral polarization UWB slot antenna 1000 can be made in a smaller structure than a single polarization UWB antenna. Antenna 1000 is preferably approximately $\lambda/\pi$ in its greatest dimension. This dimension is approximately 36% smaller than a typical $\lambda/2$ UWB dipole where $\lambda$ is the wavelength at a typical center frequency of the antenna. The chiral polarization slot UWB design of antenna 1000 includes opposing tapered slot lines 1002, 1004 each in an approximately 180° arc with an arc length substantially equal to $\lambda/2$ at a particular center frequency of interest. Each slot line terminates in a bulbous end 1006, 1008 which approximates an electrical open or free space impedance at frequencies of interest. It should be understood that discussions of impedance refer to a characteristic impedance in a particular frequency band of interest. Thus, although bulbous ends 1006, 1008 are electrical shorts at DC or low frequencies, bulbous ends 1006, 1008 can be designed to match a desired open or free space impedance within a frequency band of interest. Tapered slot lines 1002, 1004 and bulbous ends 1006, 1008 are shown in FIG. 10 as voids in a metal layer 1009. Metal layer 1009 may optionally be attached to a dielectric substrate (not shown).

Antenna 1000 will exhibit quadrupole pattern lobes normal to metal layer 1009. Antenna 1000 is sensitive to chiral polarized signals of different orientations on opposite sides. On one side, antenna 1000 will be sensitive to right-hand chiral (RHC) signals, while on an opposing side, antenna 1000 will be sensitive to left-hand chiral (LHC) signals. Thus (by way of example), an array 52 involving two pairs of antenna 1000 would suffice to provide sensitivity to either LHC or RHC along either of two orthogonal coordinate axes. Such a four element array 52 (not shown in FIG. 10) might be used in an embodiment of the present invention in which polarization is employed as a signal characteristic.

Figure 11:
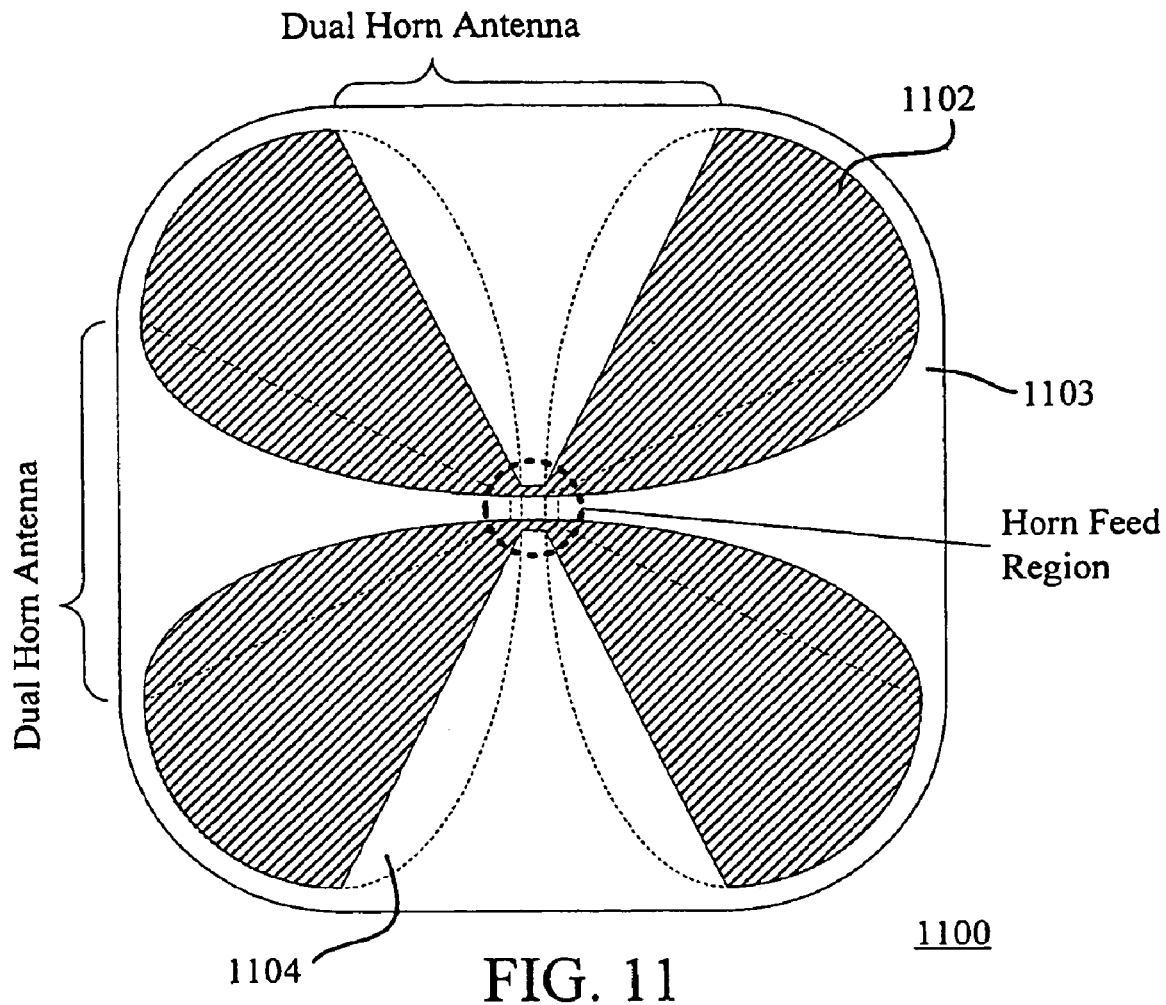
FIG. 11 illustrates a dual horn antenna system for use with the present invention.

FIG. 11 illustrates a dual horn antenna system for use with the present invention. In FIG. 11, a dual horn antenna system 1100 is constructed with a top metallization pattern establishing a first dual horn antenna 1102 on a planar substrate 1103 and a bottom metallization pattern establishing a second dual horn antenna 1104 on substrate 1103. Each dual horn antenna 1102, 1104 exhibits a dual-lobed or quadrupole type antenna pattern. Each dual horn antenna 1102, 1104 is oriented at 90 degrees relative to the other dual horn antenna 1102, 1104. Radiation from each dual horn antenna 1102, 1104 system is polarized in the plane of substrate 1103.

Figure 12:
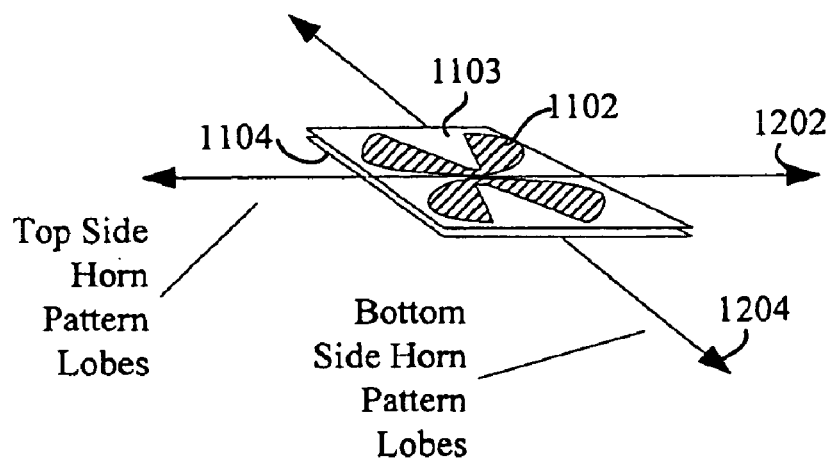
FIG. 12 provides an isometric view of the dual horn antenna system of FIG. 11.

FIG. 12 provides an isometric view of the dual horn antenna system of FIG. 11. In FIG. 12, arrows 1202, 1204 denote the directions of pattern lobes for dual horn antennas 1102, 1104.

Figure 13:
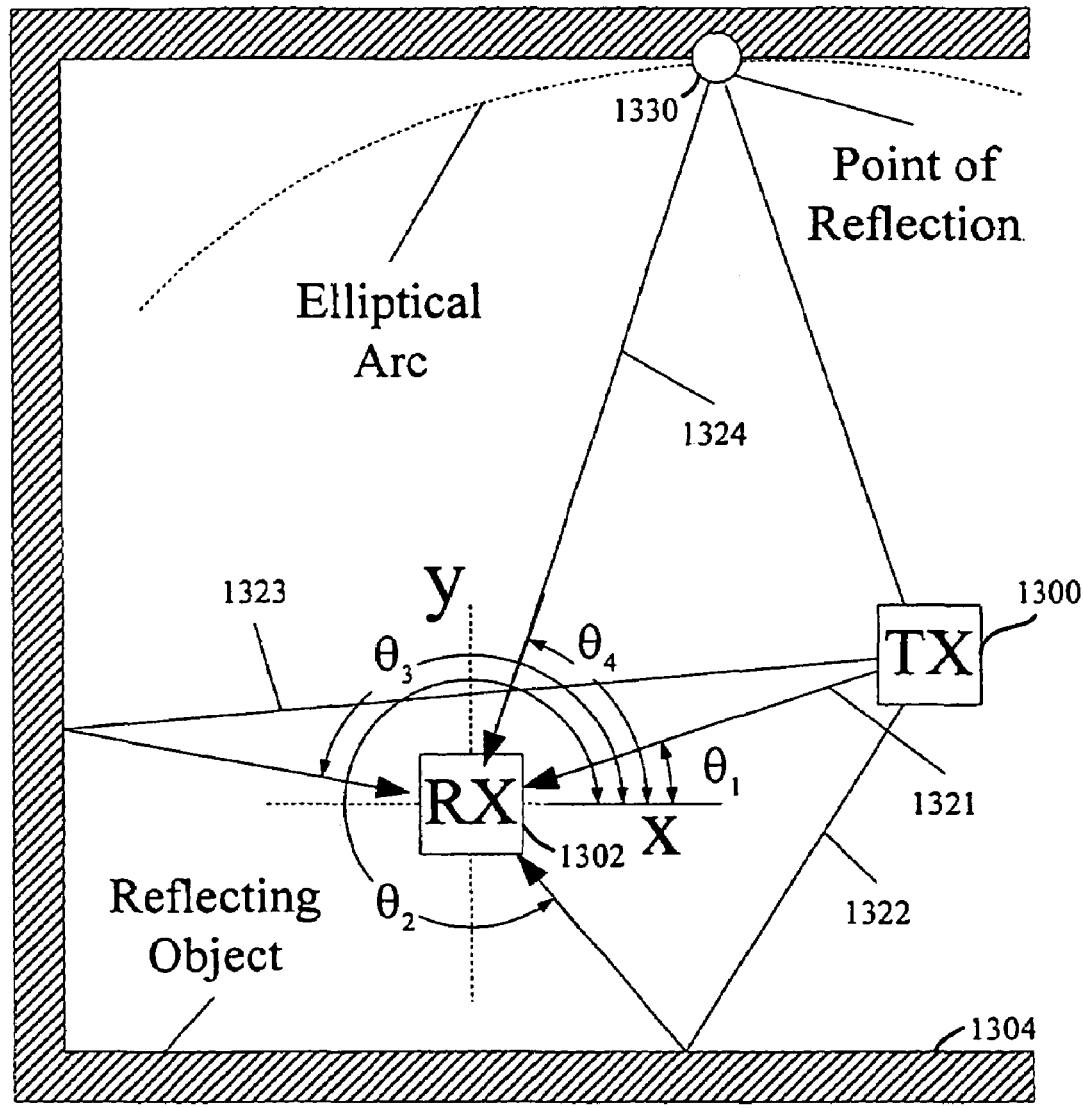
FIG. 13 illustrates shows a transmitter and a receiver employed according to the teachings of the present invention.
Figure 14:
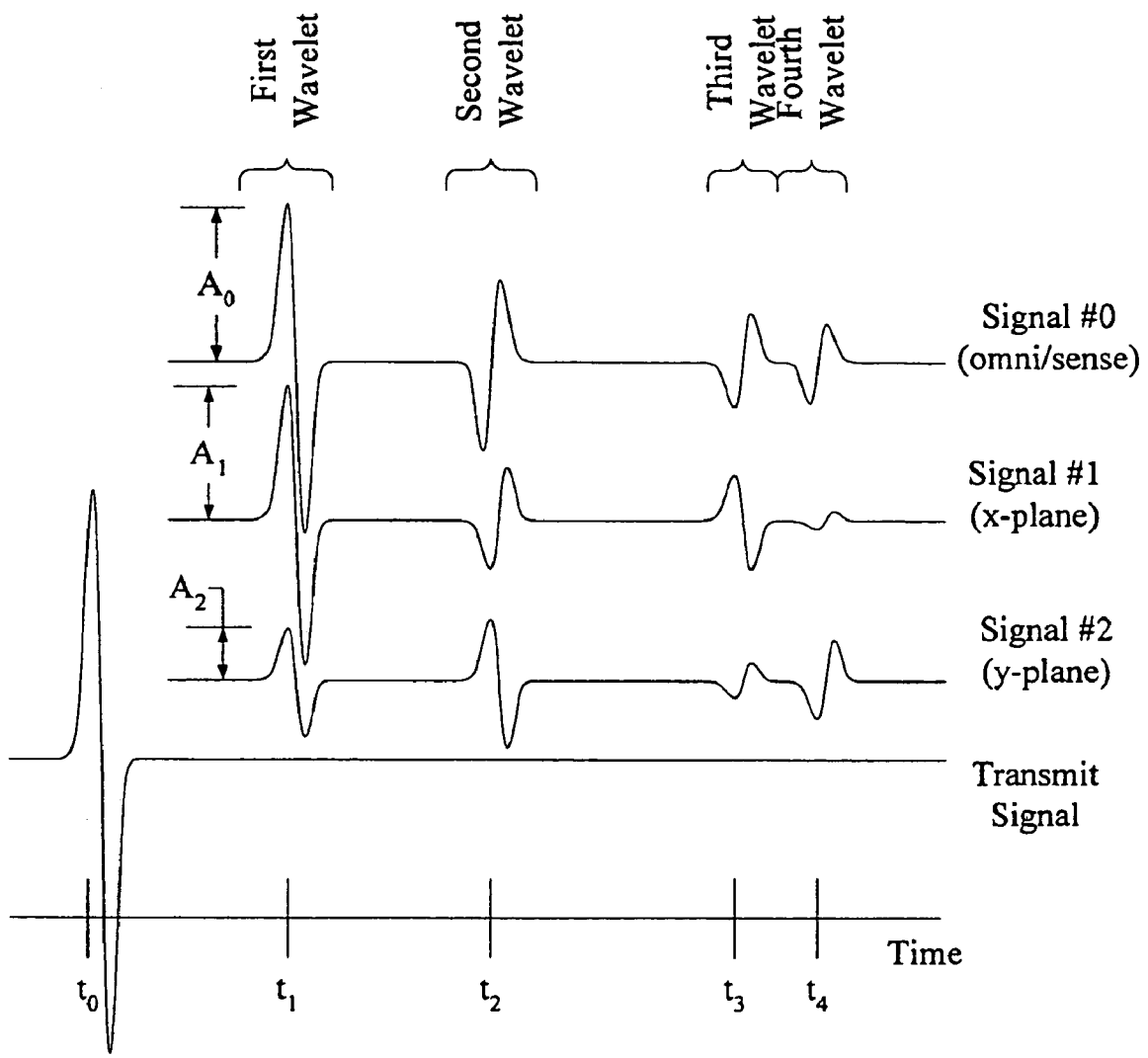
FIG. 14 illustrates typical a typical transmitted signal and received signals such as may be received by an antenna system as taught by the present invention.

FIG. 13 illustrates shows a transmitter and a receiver employed according to the teachings of the present invention. In FIG. 13, a transmitter 1300 radiates a transmitted waveform at a time $t_0$ to a receiver 1302. By way of illustration and not by way of limitation, transmitter 1300 and receiver 1302 are in the vicinity of a reflecting object 1304 thus creating a multi-path propagation environment in which receiver 1302 captures radio wave signals from a first signal path (1321), a second signal path (1322), a third signal path (1323), and a fourth signal path (1324) with angles of incidence $\theta_1, \theta_2, \theta_3, \theta_4$. Signals traversing signal paths 1321, 1322, 1323, 1324 arrive at times $t_1, t_2, t_3, t_4$ after following paths of length $L_1$ (signal path 1321), $L_2$ (signal path 1322), $L_3$ (signal path 1323), $L_4$ (signal path 1324). Arrival times $t_1, t_2, t_3, t_4$ vary linearly with path lengths $L_1, L_2, L_3, L_4$, and complete signal paths 1321, 1322, 1323, 1324 at the speed of light C. Thus a measurement of arrival times $t_1, t_2, t_3, t_4$ also effectively measures path lengths $L_1$, $L_2$, $L_3$, $L_4$. Signal path 1321 is a direct, line-of-sight path. Signal paths 1322, 1323, 1324 are indirect propagation paths that involve a reflection or bounce. For example, signal path 1324 begins at transmitter 1300, continues to a point of reflection 1330, and further continues on to receiver 1302. For purpose of illustration, reflecting object 1304 is a single object such as a wall. A typical propagation environment may be defined by a complicated combination of multiple reflecting objects such as reflecting object 1304. FIG. 14 illustrates a typical transmitted signal and received signals in a multi-path environment such as may be received by an antenna system as taught by the present invention. In FIG. 14, a transmit signal is illustrated, and several received signals are illustrated representing how the transmit signal appears in representative antennas: a signal #0 received in an omni-directional sense antenna, Signal #1 with amplitude $A_1$ received in a first directional antenna sensitive in the ±x-direction and Signal #2 with amplitude $A_2$ received in a second antenna sensitive in the ±y-direction. These amplitudes $A_1$, $A_2$ are preferentially obtained from a direct, line-of-sight path such as a first signal path 1321 (FIG. 13). For ease of illustration, the transmit signal is depicted as a simple monocycle waveform, but any other waveform, pulse shape, or waveform packet may be used in conjunction with the present invention. Received signals such as Signal #0, Signal #1, and Signal #2 are composed of a variety of wavelets: a first wavelet due to a signal arriving from a first path, a second wavelet arriving from a second path, a third wavelet arriving from a third path, and a fourth wavelet arriving from a fourth path. As received by an omni-directional antenna in Signal #0, a first wavelet is due to a line-of-sight direct signal path and has an orientation substantially similar to the transmitted waveform. A second wavelet, a third wavelet, and a fourth wavelet are due to a second path, a third path, and a fourth path (respectively) that involve a single reflection. Thus, a second wavelet, a third wavelet, and a fourth wavelet are inverted relative to a first wavelet in Signal #0. Signal #1 and Signal #2 are composed of wavelets that may or may not be inverted depending on the combination of one or more inversions due to propagation path and inversions due to the behavior of the angle of arrival antenna system. For ease of illustration, a transmitted signal has been depicted only slightly larger than Signal #0, Signal #1, and Signal #2. Typically a transmit signal is much larger than a received signal.

Also for ease of illustration, Signal #1 and Signal #2 are scaled relative to Signal #0 under the assumption that the gain of a first directional antenna and a second directional antenna is substantially equivalent to the gain of an omni-directional sense antenna. In general, however, a first directional antenna and a second directional antenna will have a gain greater than an omni-directional sense antenna, and so Signal #1 and Signal #2 will have a greater amplitude (relative to Signal #0) than depicted.

The angle of arrival, subject to an ambiguity of quadrant ($\theta'$), may be found from amplitude comparison:

$$\theta' = \arctan\frac{A_2}{A_1} \quad [4]$$

Following the teachings of the present invention, the quadrant of arrival may be determined unambiguously by a comparison of signal polarity, thus allowing for an unambiguous determination of angle of incidence, $\theta_1$.

Note that Signal #0 from an omni-directional sense antenna is not required to determine an angle of incidence $\theta_1$ if amplitudes $A_1$, $A_2$ are obtained from a first wavelet due to a direct, line-of-sight path (e.g., signal path 1321; FIG. 13). This angle of incidence from a direct, line-of-sight path $\theta_1$ (FIG. 13) is also an angular relationship $\theta_1$ of a transmitter relative to a receiver. An angular relationship $\theta_1$ in conjunction with a path length $L_1$, defines the position of a transmitter relative to a receiver. Thus, the present invention enables determination of the position of a transmitter without reliance on a multi-lateration calculation based on path lengths obtained from a network of path length measurements. Alternatively or in addition, the angle of arrival measurements possible using the present invention may be used to refine or improve a multi-lateration calculation based on path lengths obtained from a network of path length measurements.

If amplitudes $A_1$, $A_2$ are obtained from a second wavelet, a third wavelet, or a fourth wavelet, due to a second path (1322), a third path (1323), or a fourth path (1324) that are indirect propagation paths that involve a reflection or bounce, then a Signal#0 from an omni-directional sense antenna is useful. A Signal #0 exhibits the inversions due to the propagation path, allowing them to be distinguished from the inversions due to the function of the angle of arrival antenna system.

Thus, an angle-of-arrival antenna system does not require an omni-directional sense antenna but may benefit from one in the presence of significant multi-path signals.

Typically, a first directional antenna and a second directional antenna have higher gain than an omni-directional signal, so one or both of amplitudes $A_1$, $A_2$ will be larger than amplitude $A_0$. Thus a signal obtained from a combination of Signal #1 and Signal #2 is typically greater in amplitude than $A_0$.

A typical rake receiver takes a signal such as Signal#0 and detects and combines energy arriving at times $t_1$, $t_2$, $t_3$, $t_4$ so as to maximize a received signal to noise. The present invention enables a "spatial-rake receiver," one in which signals such as Signal#1 (S1) and Signal#2 (S2) are combined not only in time but also in space so as to create a received signal (S). If useful wavelets are found arriving at times $t_1$, $t_2$, $t_3$, $t_4$, a spatial rake might combine these signals as follows:

$$S = K_{11}S1\mid_{t_1 \pm \Delta t} + K_{12}S2\mid_{t_1 \pm \Delta t} + K_{21}S1\mid_{t_2 \pm \Delta t} + K_{22}S2\mid_{t_2 \pm \Delta t} \quad [5]$$
$$+ K_{31}S1\mid_{t_3 \pm \Delta t} + K_{32}S2\mid_{t_3 \pm \Delta t} + K_{41}S1\mid_{t_4 \pm \Delta t} + K_{42}S2\mid_{t_4 \pm \Delta t}$$

where $S1\mid_{t_1 \pm \Delta t}$ is Signal #1 evaluated at times within $\Delta t$ of $t_1$ so as to capture energy in a first wavelet, $S2\mid_{t_3 \pm \Delta t}$ is Signal #2 evaluated at times within $\Delta t$ of $t_2$ so as to capture energy in a second wavelet, and so on.

An exemplary spatial rake receiver might (for instance) construct a received signal (S) using angle of arrival information using coefficients:

$$K_{11}=\cos\theta_1, K_{21}=\cos\theta_2, K_{31}=\cos\theta_3, K_{41}=\cos\theta_4 \quad [6]$$

$$K_{12}=\sin\theta_1, K_{22}=\sin\theta_2, K_{32}=\sin\theta_3, K_{42}=\sin\theta_4 \quad [7]$$

In effect, these coefficients are equivalent to a rotation of a virtual antenna pattern oriented according to a choice of angle—thus making a receiver more or less sensitive in particular directions. In general however, a spatial rake receiver would use angle of arrival information as a starting point and vary the coefficients depending on the idiosyncrasies of the noise and interference environment so as to maximize the signal to noise ratio of received signal S. Additionally, a spatial rake receiver might act so as to minimize the impact of an interfering signal arriving from a particular direction by orienting a null of a virtual pattern so as to minimize sensitivity of a receiver to signals arriving from a direction in which there is undesired interference. Note that a spatial rake receiver as envisioned by the present invention does not require an omni-directional sense antenna.

If an indirect propagation path involves a single reflection or bounce such as a fourth signal path 1324 (FIG. 13), then a point of reflection must lie on an elliptical arc defined by foci at transmitter 1300 and receiver 1302 and by the path length $L_4$. If an angle of incidence $\theta_4$ is known, then the position of a point of reflection may be unambiguously identified. Thus, an angle of arrival system as taught by the present invention can identify the specific location of a point of reflection.

In a static environment the present invention may be used in conjunction with a radar intrusion detection system, allowing such a system to identify the specific location of an intruder. An object moving within the propagation environment between a transmitter and a receiver may be tracked using an angle of arrival system as taught by the present invention. Also, the location of walls or other static reflecting objects in the propagation environment may be determined.

In a dynamic environment with either a moving transmitter, a moving receiver, or both, a transmitter and a receiver with an angle of arrival system as taught by the present invention can compile data regarding the location of a point of reflection and create a radar map of the surrounding environment.

The present discussion has focused on use of an angle of arrival antenna system acting as a receiver. This does not preclude applying the teachings of the present invention in conjunction with transmission. By the principle of reciprocity for instance, an antenna system of the kind taught by the present invention can transmit a time-reversed signal with relatively dispersed energy with respect to time and result in a concentrated energy or impulsive signal at a receiver. Similarly, just as the present invention can reduce sensitivity of a receiver to interference by orienting a null of a virtual antenna pattern in a particular direction, so also can the present invention reduce transmitted power in a particular direction to avoid interference with a friendly receiver known to lie in that direction.

Figure 15:
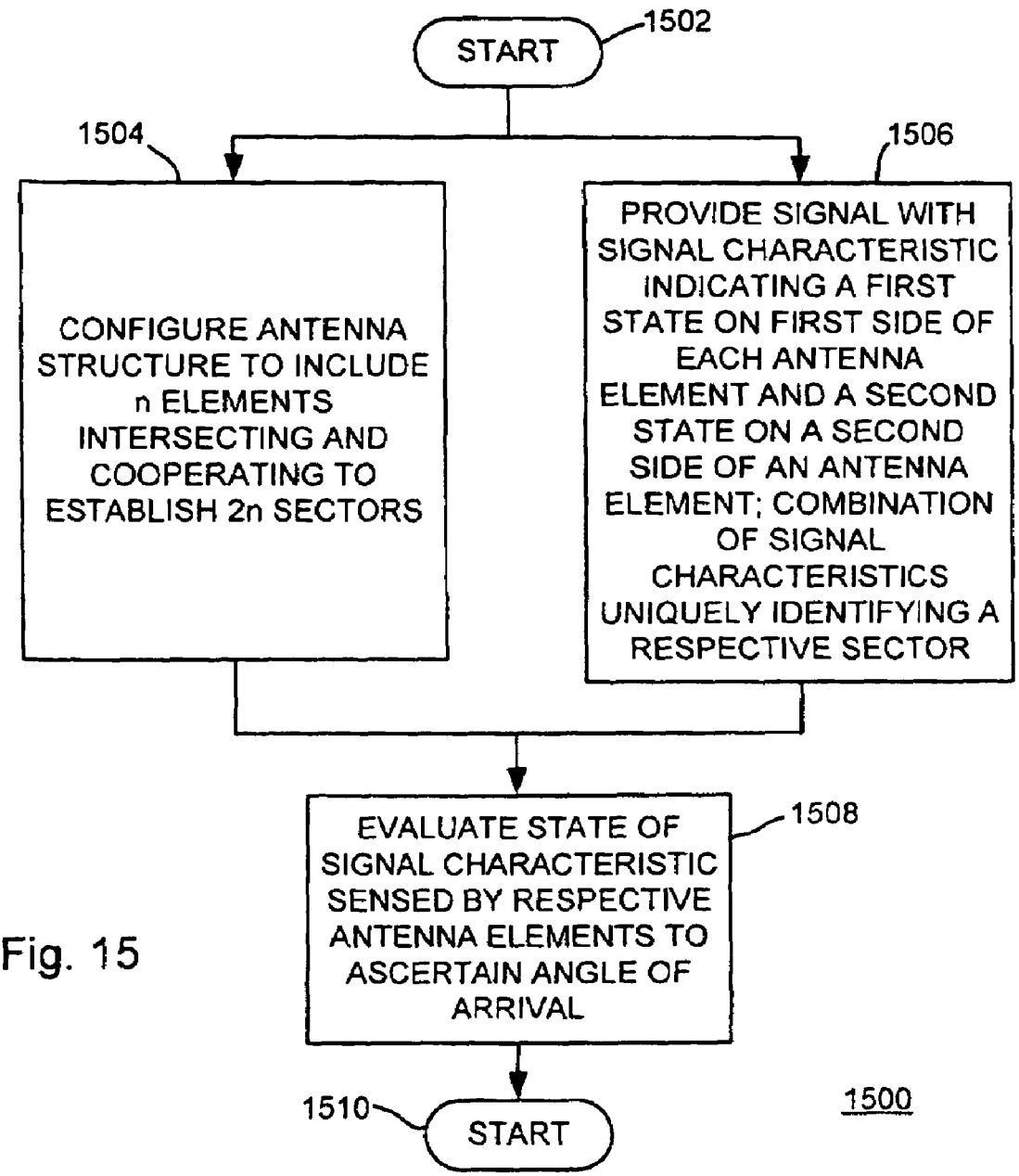
FIG. 15 is a flow chart illustrating the method of the present invention.

FIG. 15 is a flow chart illustrating the method of the present invention. In FIG. 15, a method 1500 for ascertaining angle of arrival of an electromagnetic signal at an antenna structure begins at a START locus 1502. Method 1500 continues with the step of, in no particular order (1) configuring the antenna structure to include a plurality of n antenna elements intersecting a common axis and cooperating to establish 2n sectors; each respective sector of the 2n sectors being defined by two the antenna elements of the plurality of n antenna elements and the axis, as indicated by a block 1504; and (2) providing the electromagnetic signal with at least one signal characteristic; the at least one signal characteristic indicating a first state on a first side of each respective antenna element of the n antenna elements and indicating the second state on a second side of each the respective antenna element of the plurality of n antenna elements; combinations of the signal characteristics in each the respective sector uniquely identifying the respective sector, as indicated by a block 1506.

Method 1500 continues with the step of evaluating the state of the signal characteristic sensed by each the respective antenna element to effect the ascertaining angle of arrival to a resolution of at least one the respective sector, as indicated by a block 1508. Method 1500 terminates ant an END locus 1510.

Chiral Polarization UWB Slot Antennas

FIG. 16 is a schematic diagram describing a typical chiral polarization UWB slot geometry. Slot 1602 is generally centered about feed region 1601, tapered, substantially symmetric, and generally follows arcuate path 1603. Slot 1602 terminates in bulbous terminations 1604. Arcuate path 1603 is an arc mathematically defined by a function $r(\phi)$. In a preferred embodiment, arcuate path 1603 is substantially similar to an arc of angle measure 180° defined by $$r(\phi) = R \sin \phi \quad [5]$$

where $0° \leq \phi \leq 90°$ in both a first quadrant I and a third quadrant III. Radial distance R is typically $R=\lambda/(2\pi)$ where $\lambda$ is the wavelength at a particular frequency of interest.

Unlike conventional spiral antennas which may involve a spiral following an arcuate path through many rotations, the present invention teaches a compact arcuate path 1603, one of angle measure less than 360°. Compact arcuate path 1603 taught by the present invention enables a relatively low dispersion response. In a preferred embodiment, arcuate path 1603 is substantially of angle measure 180°. Compact arcuate path 1603 provides enough length to achieve an ultrawideband response but not so much length that it yields a dispersive signal.

Although slot 1602 is compact, slot 1602 is characterized by an angle measure greater than 90° so it is capable of radiating and receiving mixed polarization signals including chiral polarization signals. A chiral polarization signal is characterized by a rotaing electric field vector that traces out a corkscrew path as a signal propagates. The corkscrew may be either clockwise (left hand) or counter-clockwise (right hand) relative to the direction of propagation. Chiral polarization is the UWB analog to circular or elliptical polarization for a narrowband signal.

Slot 1602 is further defined by a slot width $\alpha$ in the vicinity of feed region 1601 where angle $\phi=0$. The slot width of slot 1602 generally increases with increasing angle $\phi$. In the example of FIG. 16, slot width of slot 1602 increases to width $\beta$, width $\gamma$, and width $\delta$ before reaching a maximum width $\epsilon$ where $\phi=90°$.

Slot 1602 may be thought of as a single slot line substantially symmetric and centered at feed region 1601 with bulbous terminations 1604. Alternatively slot 1602 may be thought of as symmetric slot lines originating at a feed region and following an arcuate path (such as arcuate path 1603) to bulbous terminations 1604.

FIG. 17 provides a typical plot of slot width versus arc length $s(\phi)$. Arc length is mathematically defined as follows:

$$s(\phi) = \int_0^\phi \sqrt{r^2(\phi') + \frac{d}{d\phi'} r(\phi')} \, d\phi' \quad [6]$$

Slot width increases in a generally monotonic fashion yielding slot width relation 1705. Slot width relation 1705 results in a desired impedance profile such as impedance profile 1805. Slot width relation 1705 follows from a desired impedance profile (such as impedance profile 1805), as well as from the characteristics of media in the vicinity of 1602, such as a conducting medium (for example, conducting medium 1910) and/or a dielectric medium (such as dielectric 1911).

FIG. 18 presents a typical plot of impedance versus arc length $s(\phi)$. The relation between impedance and arc length defines an impedance profile such as impedance profile 1805.

Impedance profile 1805 may be an exponential impedance profile, a Klopfenstein impedance profile, or any other desired impedance profile to create desired reflection characteristics. Impedance profile 1805 may also be a non-monotonically varying impedance profile such as those taught in applicant's copending application, "Spectral control antenna apparatus and method," [application Ser. No. 10/965,921 filed Oct. 15, 2005 and published Jul. 14, 2005 with publication number US 2005/0151693], which is incorporated by reference.

FIG. 19 is a schematic diagram showing a front face of chiral polarization UWB slot antenna 1900. Terms like "front" and "back" are used for purpose of illustration, not limitation. Chiral polarization UWB slot antenna 1900 comprises feed region 1901, opposing tapered slot lines 1909, and conducting medium 1910. In a preferred embodiment, spiral slot antenna further comprises dielectric 1911. Slot 1902 is enclosed by conducting medium 1910.

Opposing tapered slot lines 1909 begin at feed region 1901 and end with bulbous terminations 1904. Bulbous terminations may be designed so as to be asymmetric to an arcuate path so as to minimize antenna dimensions. Bulbous termination 1904 may be further supplemented by absorber or other lossy material so as to minimize undesired reflections.

Feed line 1906 couples signals intermediate feed region 1901 and interface means 1908. Feed line 1906 is shown as a microstrip feedline, however in alternate embodiments, feed line 1906 may be a coaxial line, coplanar waveguide line, or other transmission line structure. Feed line 1906 may be characterized by a variable impedance so as to provide an impedance or balun transformation between interface means 1908 and feed region 1901. Interface means 1908 is shown as pads that might accept an end launch connector. In alternate embodiments, interface means 1908 may be an RF connector or a direct connection to an RF device. In a preferred embodiment, feed line 1906 terminates in via 1907 which electrically connects feed line 1906 to conducting medium 1910.

In preferred embodiments, chiral polarization UWB slot antenna 1900 is substantially planar. In alternate embodiments, chiral polarization UWB slot antenna 1900 may be sufficiently thin and flexible so as to be conformal to a curved surface. In still further alternate embodiments, chiral polarization UWB slot antenna 1900 may be implemented in conducting medium 1910 where conducting medium 1910 is an enclosure or side of an aircraft or other vehicle. Additionally, chiral polarization UWB slot antenna 1900 may be further supplemented with a cavity back or a reflecting backplane.

FIG. 20 is a schematic diagram showing a back face of chiral polarization UWB slot antenna 1900. Conducting medium 1910 is sized to encompass slot 1902 with sufficient margin to allow unhindered RF conduction around slot 1902.

Although chiral polarization UWB slot antenna 1900 is well suited for use with UWB systems, nothing in the teachings of the present invention preclude using the present invention in conjunction with broadband or other spread spectrum systems.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:
1. A chiral polarization UWB slot antenna comprising:
a feed region and
opposing tapered slot lines
said opposing tapered slot lines in an arcuate path
said arcuate path having angle measure of 360° or less,
wherein said arcuate path is substantially described by a radial variation with respect to angle of: $r(\phi)=R \sin \phi$ wherein R is a constant, and
wherein said opposing tapered slot lines terminate in bulbous ends.

2. A chiral polarization UWB slot antenna as recited in claim 1 wherein said arcuate path has an arc length substantially equal to a half wavelength at a frequency of interest.

3. A chiral polarization UWB slot antenna as recited in claim 2 wherein said arcuate path has angle measure substantially equal to 180°.

4. A chiral polarization UWB slot antenna as recited in claim 2 wherein said opposing tapered slot lines are characterized by an impedance profile and said impedance profile is substantially an exponential impedance profile.

5. A chiral polarization UWB slot antenna as recited in claim 2 wherein said opposing tapered slot lines are characterized by an impedance profile and said impedance profile is substantially a Klopfenstein impedance profile.

6. A chiral polarization UWB slot antenna as recited in claim 1 wherein constant R is substantially equal to $½\pi$ times wavelength ($R=\lambda/(2\pi)$) and wherein $\lambda$ is the wavelength at a particular frequency of interest.

7. A chiral polarization UWB slot antenna as recited in claim 6 wherein said frequency of interest lies substantially within the range from 3.1 GHz to10.6 GHz.

8. A chiral polarization UWB slot antenna comprising a substantially symmetric slot wherein said substantially symmetric tapered slot is
generally centered around a feed region,
generally follows an arcuate path,
wherein said arcuate path has angle measure substantially equal to 180°, and wherein said substantially symmetric tapered slot terminates in bulbous terminations.

9. A chiral polarization UWB slot antenna as recited in claim 8 wherein said arcuate path is compact.

10. A chiral polarization UWB slot antenna as recited in claim 8 wherein said arcuate path is characterized by an arc length and wherein said arc length is substantially equal to a half wave wavelength at a frequency of interest.

11. A chiral polarization UWB slot antenna as recited in claim 8 wherein said arcuate path is characterized by an arc length and wherein said arc length is substantially equal to a half wave wavelength at a frequency of interest.

12. A chiral polarization UWB slot antenna as recited in claim 11 wherein said substantially symmetric tapered slot is characterized by an impedance profile and said impedance profile is substantially a Klopfenstein impedance profile.

13. A chiral polarization UWB slot antenna as recited in claim 11 wherein said substantially symmetric tapered slot is characterized by an impedance profile and said impedance profile is substantially an exponential impedance profile.

14. A chiral polarization UWB spiral slot antenna comprising:
a feed region and
opposing tapered slot lines,
said opposing tapered slot lines in a spiral arcuate path, and
said spiral arcuate path having angle measure of 360° or less;
wherein said opposing tapered slot lines terminate in bulbous ends.

15. A chiral polarization UWB spiral slot antenna as recited in claim 14 wherein said spiral arcuate path is substantially described by a radial variation with respect to angle of: $r(\phi)=R \sin \phi$ wherein R is a constant.

16. A chiral polarization UWB spiral slot antenna comprising:
- a feed region and
- opposing tapered slot lines,
- said opposing tapered slot lines in a spiral arcuate path, and said spiral arcuate path having angle measure of 360° or less;
- wherein said spiral arcuate path has an arc length substantially equal to a half wavelength at a frequency of interest; and wherein said opposing tapered slot lines are characterized by an impedance profile and said impedance profile is substantially an exponential impedance profile or a Klopfenstein impedance profile.

* * * * *